3,444,021
SINTERING METHOD
William George Bilbe, Sutton-at-Hone, near Faringham, England, assignor to Istag A.G. Suhr/AG, Suhr, Aargau, Switzerland
No Drawing. Filed Apr. 5, 1966, Ser. No. 540,184
Claims priority, application Great Britain, Apr. 6, 1965, 14,536/65
Int. Cl. B32b 15/04, 31/26
U.S. Cl. 156—242                                    13 Claims

ABSTRACT OF THE DISCLOSURE

The present invention concerns a process for obtaining a sintered article having a refractory backing layer. This layer makes it possible to bond the article by means of an adhesive to a substrate, e.g., a glass or a metal surface. According to the process, a first layer, consisting of refractory particles in a matrix of an organic binder capable of carbonizing upon heating to a temperature below 385° C., e.g. an oil, is contacted with a second layer, consisting of granular polytetrafluorethylene, under sufficient pressure to create a physical adherent bond between the said first and second layers, and thereafter the resultant bonded layers are heated at an elevated temperature below 385° C. to carbonize the binder and sinter the bonded layers.

---

The present invention relates to a process for obtaining a sintered article of polytetrafluorethylene hereinafter referred to as PTFE having a refractory backing layer.

In many industrial applications it is necessary to bond a PTFE article to a substrate such as glass, metal or other material, or to apply a lacquer coating to the article. Since there does not appear to be any adhesive which forms an effective bond with untreated PTFE it has generally been necessary to resort to a rather complicated and expensive method of treating PTFE such as by using a sodium/ammonia etching process. A primary object of this invention is to provide a simple process of producing a sintered article of PTFE having a refractory backing layer which can be successfully bonded with an adhesive to a substrate.

The invention will now be described in detail.

According to the present invention, there is provided a process for obtaining a sintered article of PTFE having a refractory backing layer comprising contacting a layer of granular PTFE with a layer of refractory particles, the refractory particles being bound with an organic binder capable of carbonizing upon heating to a temperature below 385° C., under sufficient pressure to enable the particles of PTFE to come into intimate physical union with the said refractory particles and create a physically adherent bond between the said layers and sintering the resultant bonded articles at an elevated temperature which is below 385° C. The PTFE can be in a particulate form ranging from grains to a powder. Preferably the sintered article is formed by a molding operation. The organic binder may be an oil, e.g., a mineral oil, resins, or conventional organic glues. The organic binder can be omitted, although the bond between the sintered article and the substrate will be inferior to that when the binder is used.

The refractory particles used may be particles of any suitable refractory material which can serve to form a backing layer and which does not decompose at a temperature below at least 320° C., preferably not below 350° C., and more preferably not below at least 385° C. The refractory material may be an inorganic nonmetallic oxidic material or siliceous material, e.g., silica, sand, asbestos, clay, or a finely-divided mineral; or it may be a refractory metal, including metal alloys, e.g. iron, steel, copper, tin, bronze, brass, or zinc. The refractory material, which is inert with respect to PTFE, is preferably in a finely-divided state, for instance, in powder form or in the case of metals in the form of filings or other finely divided form. The sintering occurs at a temperature above 350° C. and less than the decomposition temperature of PTFE, preferably at a temperature below 385° C.

The sintered article of PTFE having an adherent backing layer produced in accordance with this invention may be readily bonded to a substrate with an adhesive, for instance by using commercial adhesives such as that known upnder the trademark "Araldite," urea resins, kaurit glue, melamine resins, phenol resins, phenol-cresol resins, resorcinol-formaldehyde resins, isocyanate, cements, desmophene, and the cement known under the trademark "Desmodur," for example. Alternatively, a durable coating such as of a lacquer, can be applied to the adherent backing. Preferred embodiments of the process will now be described by way of example.

EXAMPLE I

The refractory material is sand but the procedure is substantially the same whatever refractory material is chosen.

A mold consisting of a metal frame, a top plate and bottom plate was used. The top plate of "duralumin" was coated with a thin film of "Castrol" gearbox oil (a mineral oil with additives), using a felt squeeze.

Dried sand was sieved through a screen having 30 meshes per linear inch and then distributed uniformly over the oil-coated surface of the top plate. Surplus sand not retained by the oil film is lightly shaken off.

The frame is placed over the bottom plate and the mold filled with particles of PTFE to the level of the top of the frame; the top plate treated as above is reversed so that the sand-treated surface is in contact with the surface level of the PTFE. Hydraulic pressure is then applied to the mold to create a satisfactory physical bond between the contacting layers of sand and PTFE. This may be regarded as a kind of interlocking bonding between the sand and PTFE particles.

The molded article is removed from the mold and sintered for 36 hours at 380° C., the oil being carbonized during the sintering operation, and therafter allowed to cool to ambient temperature.

The resultant sintered article of PTFE was successfully bonded via its backing layer to a glass panel using "Araldite" as adhesive.

EXAMPLE II

The process exemplified above was repeated with equal success but instead of sand, iron filings were used as the refractory material for the backing layer.

The term refractory as used herein is intended to mean any material resistant to the sintering temperatures and suitable for the intended purpose.

I claim:
1. A process for obtaining a sintered article having a refractory backing layer, said process comprising contacting a first layer, consisting of refractory particles in a matrix of an organic binder capable of carbonizing upon heating to a temperature below 385° C., with a second layer, consisting of granular polytetrafluorethylene, under sufficient pressure to create a physically adherent bond between the said first and second layers, and thereafter heating the resultant bonded layers to a temperature below 385° C. to carbonize the binder and sinter the thusly bonded layers.

2. A process according to claim 1, wherein the layers are placed in a molding zone and pressed together therein.

3. A process according to claim 1, wherein the refractory material is in powdered or other finely divided form.

4. A process according to claim 1, wherein the organic binder is an oil.

5. A process according to claim 4, wherein the layers are placed in a molding zone and pressed together therein.

6. A process according to claim 1, wherein the refractory material is a non-metallic oxidic or siliceous material.

7. A process according to claim 6, wherein the refractory material is silica.

8. A process according to claim 1, wherein the refractory material is a refractory metal or metal alloy.

9. A process according to claim 8, wherein the refractory metal or alloy is iron, steel, copper, tin, zinc, bronze or brass.

10. A process according to claim 1, wherein the bonded layers are heated at a temperature between 350° C. and 385° C.

11. A process according to claim 10, wherein the temperature is 380° C. and heating is effected for 36 hours.

12. A process according to claim 1, comprising bonding the refractory backing layer of the sintered article to a substrate with an adhesive.

13. A process according to claim 12, wherein the substrate is glass or metal.

References Cited

UNITED STATES PATENTS

| | | | |
|---|---|---|---|
| 2,638,523 | 5/1953 | Rubin. | |
| 2,728,698 | 12/1955 | Rudner | 161—189 XR |
| 2,762,116 | 9/1956 | Rudner | 156—91 XR |
| 2,887,526 | 5/1959 | Rudner | 264—127 XR |
| 3,094,585 | 6/1963 | Rudner | 161—189 XR |
| 3,365,355 | 1/1968 | Netsch | 161—189 XR |

ROBERT F. BURNETT, *Primary Examiner.*

WILLIAM A. POWELL, *Assistant Examiner.*

U.S. Cl. X.R.

156—249, 276, 297; 161—189, 196; 264—29, 127